(12) United States Patent
Saccomanno

(10) Patent No.: US 7,172,326 B2
(45) Date of Patent: Feb. 6, 2007

(54) OPTICAL FILTER SYSTEM EMPLOYING A TILTED REFLECTOR

(75) Inventor: Robert J. Saccomanno, Montville, NJ (US)

(73) Assignee: Honeywell International, Inc., Morristown, NJ (US)

( * ) Notice: Subject to any disclaimer, the term of this patent is extended or adjusted under 35 U.S.C. 154(b) by 238 days.

(21) Appl. No.: 10/921,310

(22) Filed: Aug. 19, 2004

(65) Prior Publication Data
US 2006/0039161 A1    Feb. 23, 2006

(51) Int. Cl.
| F21V 13/12 | (2006.01) |
| F21V 8/00 | (2006.01) |
| F21V 9/00 | (2006.01) |
| G02B 6/42 | (2006.01) |
| F21V 9/04 | (2006.01) |
| G05D 25/00 | (2006.01) |

(52) U.S. Cl. ............. 362/583; 362/293; 362/552; 385/31; 385/88

(58) Field of Classification Search ............ 362/583, 362/552, 293, 19
See application file for complete search history.

(56) References Cited

U.S. PATENT DOCUMENTS

| 3,676,667 | A | | 7/1972 | Malifaud |
| 3,825,336 | A | * | 7/1974 | Reynolds ............ 362/293 |
| 4,602,321 | A | * | 7/1986 | Bornhorst ............ 362/293 |
| 4,767,653 | A | | 8/1988 | Renstrom |
| 4,915,479 | A | | 4/1990 | Clarke |
| 5,031,078 | A | * | 7/1991 | Bornhorst ............ 362/293 |
| 5,143,433 | A | | 9/1992 | Farrell |
| 5,211,463 | A | | 5/1993 | Kalmanash |
| 5,262,880 | A | | 11/1993 | Abileah |
| 5,367,444 | A | * | 11/1994 | Bornhorst et al. ....... 362/293 |
| 5,559,911 | A | | 9/1996 | Forkner et al. |
| 5,574,286 | A | | 11/1996 | Huston et al. |
| 5,585,640 | A | | 12/1996 | Huston et al. |
| 5,822,478 | A | * | 10/1998 | Kim ................ 385/33 |
| 5,842,765 | A | * | 12/1998 | Cassarly et al. ........ 362/293 |
| 5,867,622 | A | * | 2/1999 | Miyasaka et al. ........ 385/88 |

(Continued)

FOREIGN PATENT DOCUMENTS

JP    09009114    1/1997

(Continued)

OTHER PUBLICATIONS

Beamsplitters and Beam Attenuators for Ultraviolet and Visible Applications, Optical Coating Laboratory, Inc. 2003.

(Continued)

Primary Examiner—Alan Cariaso
(74) Attorney, Agent, or Firm—Ingrassia Fisher & Lorenz

(57) ABSTRACT

An illumination system comprising a light source that emits light of a first sense and a second sense. The illumination system also comprises a collimator that collimates light from the light source along an optical axis and within a maximum angle with respect to the optical axis. The illumination system further comprises a filter that reflects light of the first sense, the filter positioned at an angle other than normal to the optical axis and other than 45 degrees from the optical axis. Further, the illumination system also includes an optical system positioned along the optical axis to accept light that passes through the filter and transmits the portion of the light within the maximum angle.

12 Claims, 2 Drawing Sheets

U.S. PATENT DOCUMENTS

| | | |
|---|---|---|
| 5,902,033 A | 5/1999 | Levis et al. |
| 5,967,653 A | 10/1999 | Miller et al. |
| 6,039,451 A | 3/2000 | Grave |
| 6,097,549 A | 8/2000 | Jenkins et al. |
| 6,111,622 A | 8/2000 | Abileah |
| 6,139,175 A | 10/2000 | Tomioka et al. |
| 6,142,637 A | 11/2000 | Cohen et al. |
| 6,219,480 B1 | 4/2001 | Cassarly et al. |
| 6,310,671 B1 | 10/2001 | Larson |
| 6,428,198 B1 | 8/2002 | Saccamanno et al. |
| 6,450,645 B1 | 9/2002 | Jeon |
| 6,496,309 B1 | 12/2002 | Bliton et al. |
| 6,607,280 B2 | 8/2003 | Koyama et al. |
| 6,654,178 B1 | 11/2003 | Lee |
| 6,724,543 B1 | 4/2004 | Chinniah et al. |
| 2002/0061032 A1 | 5/2002 | Miura et al. |
| 2002/0088952 A1* | 7/2002 | Rao et al. ............... 250/559.45 |
| 2003/0025842 A1 | 2/2003 | Saccomanno |
| 2003/0071934 A1 | 4/2003 | Saccomanno et al. |
| 2003/0152336 A1* | 8/2003 | Gurevich et al. ............. 385/88 |
| 2003/0198456 A1 | 10/2003 | Steiner et al. |

OTHER PUBLICATIONS

U.S. Appl. No. 60/439,886, Homogenizer for Collimated Light with Controlled Hight Angle Scatter, filed Jan. 14, 2003, Robert J. Saccomanno.

* cited by examiner

OPTICAL FILTER SYSTEM EMPLOYING A TILTED REFLECTOR

DESCRIPTION OF THE INVENTION

1. Field of the Invention

The subject matter of this application relates to illumination systems. More particularly, the subject matter of this application relates to an illumination system comprising an optical filter.

2. Background of the Invention

Color displays, such as liquid crystal displays (LCDs), and other backlit devices, are continually finding new uses in areas such as information displays used in aircraft, including military aircraft. At nighttime and in low light conditions these displays are often used in conjunction with night vision goggles (NVGs). Night vision goggles are designed to detect near-infrared light. Generally, red corresponds to wavelengths ranging from about 625 nm to about 700 nm, deep-red corresponds to wavelengths ranging from about 700 nm to about 760 nm, and near-infrared corresponds to wavelengths ranging from about 760 nm to about 930 nm.

Problems exist, however, when using displays in conjunction with night vision goggles. One particular problem is that the display often emits stray near-infrared light that is detected by the night vision goggles. This has led to the need to suppress stray infrared and near-infrared light emitted by the display to avoid interfering with the night vision goggles, as defined in military standard MIL-STD-3009 and its predecessor, MIL-L-85762A. In practice, to meet the standard, the near-infrared suppression must achieve optical densities of 4 or 5 for wavelengths from 625 nm to 930 nm.

One solution for suppressing stray infrared and near-infrared light has been to use filters to cut off the near-infrared light emitted by the display while allowing the visible spectrum to pass. For example, U.S. Pat. No. 5,262,880 discloses a filter in front of a light source. The filter is sandwiched parallel between an image splitting lens and a diffuser to achieve a low profile of the display. Such filters are available from sources such as Wamco (Fountain Valley, Calif.).

However, there is a need to increase the ratio of transmitted visible light to rejected near-infrared light from the display while also achieving good color saturation for red, green, and blue. Improving this ratio leads to higher goggle sensitivity, where there is less near-infrared light "noise" emitted by the display and detected by the night vision goggles. Evidence of such a need can be found in U.S. Display Consortium contract RFP03-88, a purpose of which is to provide recommendations to the Department of Defense for modifications to MIL-STD-3009/MIL-L-85762A (Lighting, Aircraft, Night Vision Imaging Systems [NVIS] Compatibility) to address issues of 1) black background NVIS radiance for LCDs, 2) maximum luminance and radiance of NVG filtered light output, and 3) NVIS radiance requirements for class C (leaky green) goggles. See for example, http:/www.usdc.org/technical/tech_contracts.html#03-88, issued to Honeywell's Albuquerque, N. Mex. facility in 2003.

Improving the ratio also permits the use of lower-power displays. Both of these improvements can enhance the reliability of the display by achieving higher brightness levels with less power than is currently achievable. One method of improving this ratio is to use a transmissive LCD with a dual-mode backlight that comprises one or more unfiltered fluorescent lamps for daytime operation, and one or more filtered auxiliary lamps for operation with night vision goggles. Such systems can be found in, for example, U.S. Pat. Nos. 5,143,433; 5,211,463; and 6,039,451.

To achieve high optical densities, one must consider the effects of polarization, among other things, on filter design. However, some systems focus on making filter design easier. These systems use light from an incoherent source (e.g. incandescent lamp or even a white LED) that is un-polarized, and as known in the art, the effects of polarization pose design challenges for systems using beamsplitters. For example, see U.S. Pat. No. 6,654,178, col. 1, lines 30–44.

Thus, there is a need to overcome these and other problems in the art and to provide an illumination system and a method for it use to increase the ratio of transmitted visible light to rejected near-infrared light from a display.

SUMMARY OF THE INVENTION

In accordance with the invention, there is an illumination system comprising, in the most general terms, a light source that emits light of an undesirable first sense, and a desirable second sense, where the first and second sense comprise a combination of wavelengths, polarization states, phase relationships, and/or time dependent properties. The illumination system also comprises a collimator, for example, a parabolic reflector, that collimates light from the light source along an optical axis and within a maximum angle with respect to the optical axis. The illumination system further comprises a filter that reflects light of the first sense, the filter can be canted at an angle other than normal to the optical axis but less than 45 degrees from the optical axis. By operating close to normal incidence, polarization effects are minimized ensuring high optical densities for first pass-light. Further, the illumination system also comprises an optical system positioned along the optical axis to accept light that passes through the filter and transmits the portion of the light within a maximum angle or numerical aperture (NA). Due to the mirror tilting, light rejected on the first pass that makes it back for a second pass, will be at a more off-normal angle, and preferably outside the maximum angle of the optical system, thereby enhancing the rejection of undesired light.

In another embodiment there is an illumination system comprising a light source that emits light comprising light of a first sense and a second sense and a parabolic reflector that collimates light emitted from the light source along an optical axis. The system further comprises a filter positioned along the optical axis such that a first portion of the first sense of light originally received from the light source is reflected at a first angle and at least one fiber coupling element positioned along the optical axis to accept light from the light source that passes through the filter.

In another embodiment there is a method of providing light to an optical system comprising providing a light source that emits light comprising a first sense of light and a second sense of light and collimating the light from the light source along an optical axis. The method also comprises reflecting a first portion of the first sense of light emitted from the light source using a filter and collecting light that passes through the filter with a fiber coupling element, wherein the fiber coupling element comprises a first end to receive light that passes through the filter and a second end that couples light to a numerical aperture limited optical device.

According to various embodiments there is a method of providing light to an optical fiber with a fiber coupler, wherein the fiber coupler comprises a first end to receive light that passes through the filter and a second end that couples to an optical fiber.

Additional advantages of the invention will be set forth in part in the description which follows, and in part will be obvious from the description, or may be learned by practice of the invention. The advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and, together with the description, serve to explain the principles of the invention.

In the drawings.

DESCRIPTION OF THE EMBODIMENTS

Reference will now be made in detail to the present embodiments, examples of which are illustrated in the accompanying drawings. Wherever possible, the same reference numbers will be used throughout the drawings to refer to the same or like parts. These embodiments are described in sufficient detail to enable those skilled in the art to practice the invention and it is to be understood that other embodiments may be utilized and that changes may be make without departing from the scope of the present invention. The following description is, therefore, not to be limiting.

Figure 1:
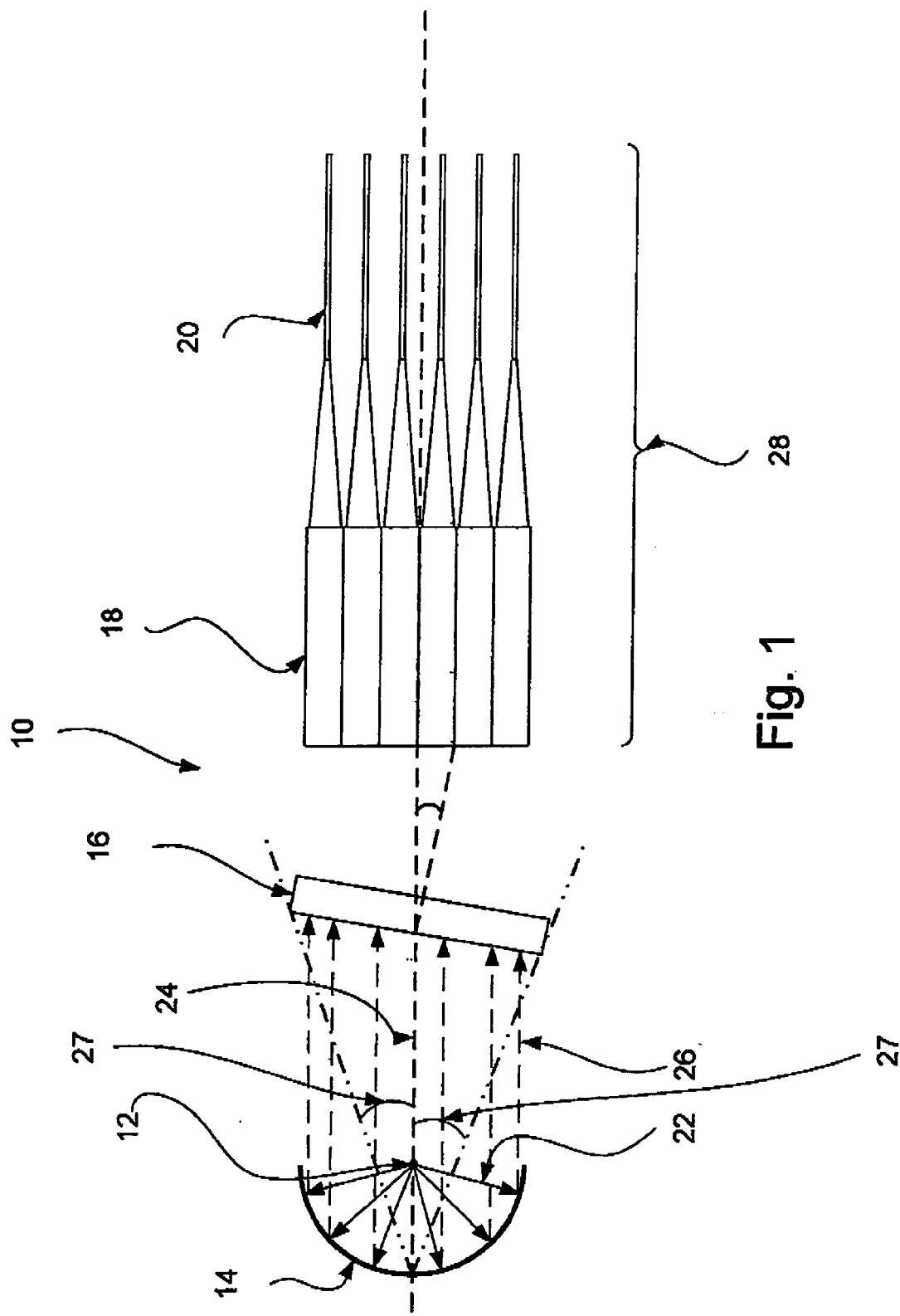
FIG. 1 depicts an illumination system in accordance with an exemplary embodiment.
Figure 2:
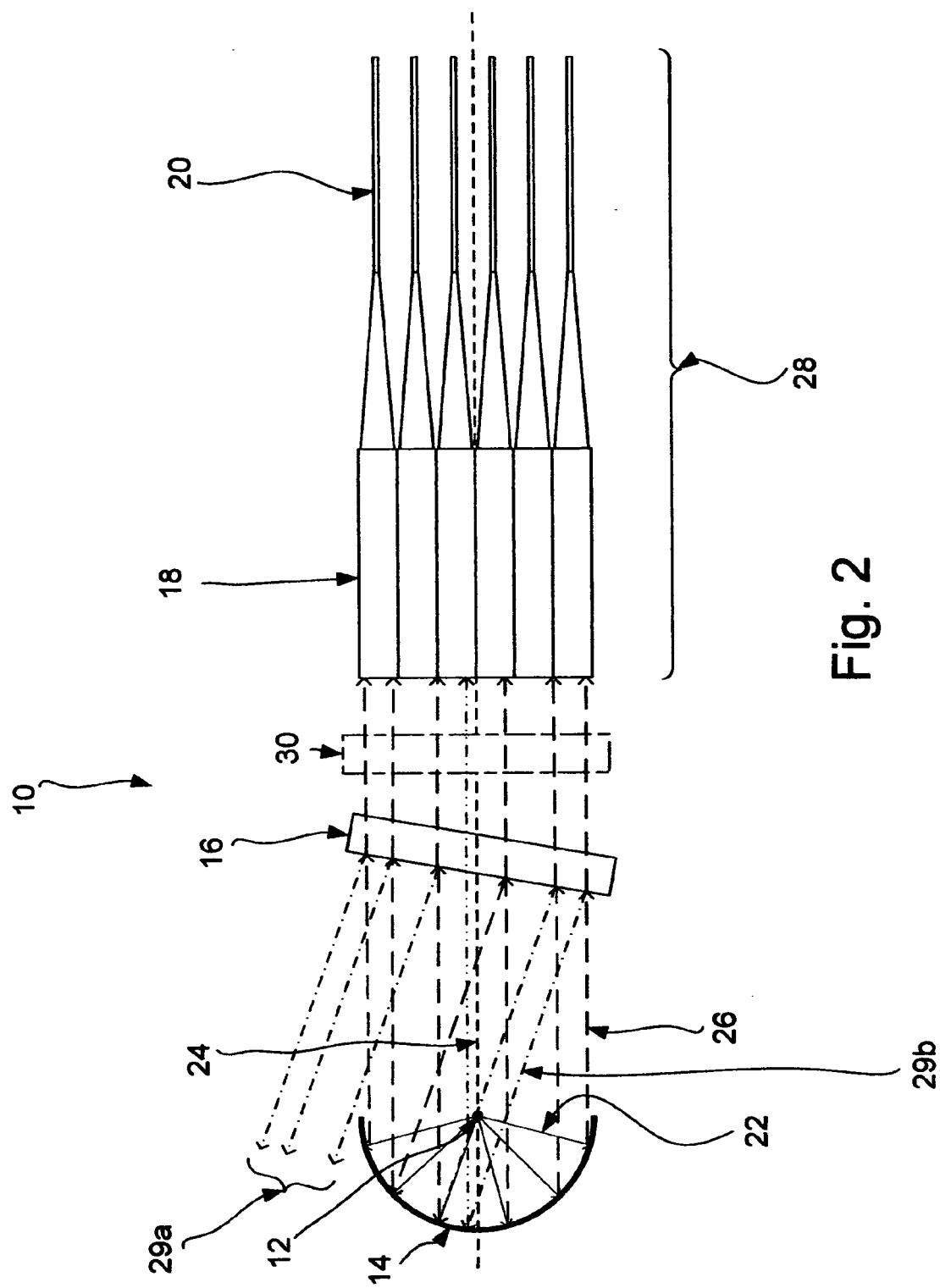
FIG. 2 depicts an illumination system in accordance with another exemplary embodiment.

FIGS. 1–2 disclose an apparatus and a method for illumination that includes suppressing near-infrared light emitted from a display. FIG. 1 depicts an exemplary illumination system 10 including a light source 12, a collimator 14, a filter 16, a plurality of fiber couplers 18, and a plurality of optical fibers 20. Generally, an optical system 28 can comprise various devices including the fiber couplers 18, the optical fibers 20, or an aperture stop (not shown), and/or other numerical aperture (NA) limited optical devices.

Further, embodiments disclosed in U.S. patent applications U.S. 20030071934 and U.S. 20030025842, each having a common assignee with the present disclosure and incorporated herein by reference in their entirety, comprise a dual mode backlight contemplated to meet the expectation of a lower cost and higher performance NVG-compatible display system and are compatible with embodiments disclosed herein.

According to various embodiments, light source 12 can be any appropriate light source that can emit light of a particular sense, including a first undesirable sense of light and a second desirable sense of light. According to an embodiment, the first sense can comprise near infrared wavelengths of light.

According to various embodiments disclosed herein, the term sense can be understood to describe a given combination of polarization state(s), wavelength(s), phase relationships, and time based properties. For example, the sense of a light source S1, (e.g. an incandescent lamp) can comprise numerous wavelengths throughout the visible, near-infrared, and infrared with the wavelengths being randomly polarized. The sense of light after a near-infrared filter could be designated as S2, and would comprise S1 less the near-infrared wavelengths. Further, the sense of light after a cube beamsplitter that reflects s-polarized light could be designated as S3, and would comprise S2 less any s-polarized components reflected from the cube beamsplitter. Some examples of the term sense can be found in U.S. patent application 20030025842 and U.S. Pat. No. 6,142,637, both of which are incorporated herein in their entirety. As such, in various embodiments, sense is understood to mean that the light comprises a given wavelength or set of wavelengths; a given polarization state or set of polarization states; etc.

Light emitted from light source 12 is shown generally in FIG. 1 as the solid lines, an example of which is labeled 22. Some appropriate light sources can include, for example, a point light source such as a white LED from Lumileds (San Jose, Calif.), an arc lamp, such as a metal halide lamp, an incandescent lamp, or laser diode. In the case of a NVG application, the lamp can be dimmable, either electrically (e.g. pulse-width modulated) or through other means (e.g. electro-optical or electromechanical). Depending on a number of factors, the lamp can be, for example, a Luxeon LXHL-NWG8 warm-white collimated LED. In an exemplary embodiment, light source 12 and collimator 14 can be aligned along an optical axis 24 depicted by the dotted line shown in FIG. 1.

In various embodiments collimator 14 can surround a portion of light source 12. Collimator 14 collimates light 22 emitted from light source 12 in the form of a beam, shown generally in FIG. 1 as dotted lines with solid arrow heads, an example of which is labeled 26. The collimated beam 26 can have a propagation direction in the direction of optical axis 24. In various embodiments, the collimated beam 26 can be directed towards filter 16 at a maximum angle θ away from optical axis 24, shown, for example, as angle 27 in FIG. 1. According to various embodiments, collimator 14 can comprise a radial collimator, such as for example, a parabolic reflector. Other appropriate systems suitable as the radial collimator can be found in U.S. Pat. Nos. 3,676,667; 5,902,033; 5,967,653; 6,097,549; and 6,724,543, each of which is incorporated herein in its entirety. Still further, in some embodiments, the radial collimator can comprise a cold mirror that suppresses or does not reflect near-infrared light. Such coatings can be obtained from Deposition Sciences (Santa Rosa, Calif.).

As shown in FIG. 1, filter 16 is positioned between light source 12 and optical system 28. Examples of appropriate fiber couplers 18 are further described in U.S. Pat. Nos. 6,428,198; 4,915,479; 5,559,911; 6,139,175; and 6,219,480, each of which is incorporated herein in its entirety.

According to various embodiments, filter 16 can be a filter that can pass light within a certain numerical aperture. For example, filter 16 can be a high-rejection ratio filter that generally blocks certain wavelengths of light, for example near-infrared light, while at the same time allowing visible light to pass. In various embodiments, filter 16 is positioned at an angle other than normal to optical axis 24 and less than 45 degrees from optical axis 24. Moreover, filter 16 can be posited at an angle of between +30 degrees and −30 degrees away from normal to the optical axis. In some cases, polarization effects can become severe when filter 16 is positioned beyond ±30 degrees. See for example, "Beamsplitters and Beam Attenuators for Ultraviolet and Visible Applications," Optical Coating Laboratory, Inc. 2003, <<http://ocli.com/pdf_files/products/beamsplitters-_beam_attenuators.pdf>>.

In various embodiments, filter 16 can be, for example a high optical density filter, such as those available from Omega Optical (Brattleboro, Vt.). Other acceptable filters are those available from ZC&R (Torrance, Calif.), Optical Coating Laboratory Incorporated, (OCLI) (Santa Rosa, Calif.), and Thin Film Devices Inc (Anaheim, Calif.).

As shown in FIG. 1, fiber couplers 18 are positioned downstream of filter 16. Fiber couplers 18 can be any non-imaging optics or array of non-imaging optics that can receive the collimated light that passes through filter 16. After receiving the collimated light, fiber couplers 18 concentrate the light and direct it onto one or more NA limited optical devices, such as optical fibers 20. According to various embodiments, an infrared and near-infrared absorbing material (not shown), such as a conventional black jacketing material, can surround fiber couplers 18 and/or NA limited optical devices, such as optical fibers 20.

Optical fibers 20 can then transmit the received light to the appropriate object, such as for example, an instrument panel requiring backlighting. As used herein, "instrument panel" can mean any display, gauge, device, or system that shows information such as, for example, instrument panels and computer displays.

As shown in FIG. 2, which is an exemplary representation of another embodiment, a beam homogenizer 30 can be positioned between filter 16 and fiber couplers 18. Further, additional infrared and near-infrared absorbing material (not shown) can surround fiber couplers 18 to assist in suppressing near-infrared light that leaks out before coupling into optical fibers 20. Moreover, according to various embodiments, portions or all of the exterior of fiber couplers 18 can be coated with a material that can extract and absorb near-infrared light. For example, a cladding layer (not shown) can be used to surround at least fiber couplers 18, followed by a near-infrared absorbing layer that can absorb high-angle near-infrared light.

"As shown in FIG. 2, light source 12 emits light 22, as shown with solid lines with solid arrow heads. Light 22 can comprise light of a first sense and light of a second sense. Light of the first sense can be of an undesirable sense. For example, light of the first sense can be near-infrared and/or of an undesirable polarization. Light 22 emitted from light source 12 impinges collimator 14, such as a parabolic reflector. Collimator 14 collimates light 22 and directs it at filter 16, as shown with dotted line 26 with solid arrow heads. A majority of the near-infrared light emitted by light source 12 is reflected by filter 16. Near-infrared light emitted from light source 12 is reflected from filter 16 because filter 16 is positioned at an angle other than normal to optical axis 24. In this way, a majority or all of the light of the first sense can be reflected by filter 16. Further, filter 16 can be positioned at an angle other than 45 degrees from optical axis 24. Moreover, filter 16 can be positioned at an angle of between +30 degrees and −30 degrees away from normal to the optical axis. In various embodiments, near-infrared light reflected off of filter 16 is directed back toward light source 12 at an angle greater than it was received by filter 16, as shown by dashed-dotted lines having dashed arrow heads. Reflecting near-infrared light from tilted filter 16 reduces the near-infrared light that reaches optical fibers 20."

In certain embodiments, a small portion of the near-infrared light emitted by light source 12 may pass through filter 16. Accordingly, the angle of filter 16 can be adjusted to improve the rejection ratio of filter 16 to minimize the near-infrared light reaching optical fibers 20 so that night vision goggles are not saturated. In some cases, polarization effects can become severe when filter 16 is positioned beyond ±30 degrees.

Further, the near-infrared light that is directed back to light source 12 can be recycled for another pass. However, because filter 16 is positioned at an angle other than normal to optical axis 24, the recycled light impinges filter 16 at an angle greater than the angle at which the collimated light originally impinged filter 16. A portion of the recycled light may again be reflected off of filter 16 while another portion may pass through filter 16. However, near-infrared light that passes through filter 16 on the second pass (and subsequent passes) will exceed the numerical aperture of the downstream optics 28 and will be absorbed.

According to an embodiment, on a first pass of light along the optical axis 24, a portion of the reflected light 29a will be rejected/absorbed and the remaining second portion, an example of which is labeled 29b, will recycle through the light source 12. By virtue of the canting angle of the filter 16, the recycled second portion may not be properly aligned to the collimation optics 14. As such, the second portion can make its next pass towards the filter 16 at a greater angle to the optical axis 24 than on the first pass. The portion of the second-pass that leaks through the filter 16 due to its limited optical density can be rejected downstream by the optical system 28 because the downstream devices include a NA limited optics device that has a limited numerical aperture. NA-limited optics can comprise, for example: fiber coupling elements 18; optical fibers (e.g. black jacketed Mitsubishi ESKA fiber), such as optical fibers 20; other light guides with a defined cladding (see for example, U.S. Provisional Patent Application 60/439,886 sharing a common assignee with the present disclosure and incorporated herein in its entirety); or can include the aperture of a stop (see for example, U.S. Pat. No. 6,607,280 which is incorporated herein in its entirety and Chapter 6 in Modern Optical Engineering, Third Edition, W. Smith, ISBN 0-07-136379-3, also incorporated herein in its entirety). In the above embodiment, light of the desired second sense can be received by optical fibers 20 while a majority or all of the light of the first sense is prevented from reaching optical fibers 20.

Various embodiments described herein can reduce or eliminate the need for an absorbing near-infrared filter. In certain cases, absorbing near-infrared filters have been positioned between a light source and a near-infrared reflecting filter. However, absorbing near-infrared filters are known to produce orange to red light which can lower the overall efficiency of illumination systems.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An illumination system comprising:
    a light source emitting light of a first sense and a second sense;
    a collimator that collimates light from the light source along an optical axis and within a maximum angle with respect to the optical axis;
    a filter that reflects light of the first sense, the filter positioned at an angle other than normal to the optical axis and less than 45 degrees from the optical axis; and an optical system positioned along the optical axis to reject light that passes through the filter beyond a predetermined maximum angle, the optical system comprising at least one fiber coupler and at least one optical fiber, the at least one fiber coupler coupling light that passes through the filter to the at least one optical fiber, and a material absorbing light of the first sense surrounding a portion of the fiber coupling elements, the material absorbing light of the first sense that escapes the at least one fiber coupler before reaching the at least one optical fiber.

2. The illumination system of claim 1, wherein the filter reflects light of the first sense emitted by the light source in a direction of the collimator.

3. The illumination system of claim 1, wherein the collimator comprises a radial collimator.

4. The illumination system of claim 1 further comprising:
a cladding surrounding each of the at least one optical fiber.

5. The illumination system of claim 1, wherein the portion of the light of the first sense that is reflected towards the light source is directed back towards the filter at an angle such that a second portion of the light of the first sense passing through the filter yields a numerical aperture that exceeds the numerical aperture of a device of the optical system.

6. The illumination system of claim 1 further comprising:
a beam homogenizer positioned between the optical system and the filter.

7. The illumination system of claim 1, wherein the radial collimator comprises a mirror that reflects light of the second sense and suppresses reflection of light of the first sense.

8. An illumination system comprising:
a light source that emits light comprising light of a first sense and a second sense;
a radial collimator that collimates light emitted from the light source along an optical axis;
a filter positioned along the optical axis such that a first portion of the first sense of light originally received from the light source is reflected at a first angle;
at least one fiber coupling element positioned along the optical axis to accept light from the light source that passes through the filter;
at least one optical fiber coupled to the at least one fiber coupling element; and
a light absorbing material surrounding at least a portion of the at least one fiber coupling element to absorb light of the first sense that escapes the at least one fiber coupling element before reaching the at least one optical fiber.

9. The illumination system of claim 8, wherein the filter is positioned at an angle of between about +30 degrees and about −30 degrees away from normal to the optical axis.

10. The illumination system of claim 8, wherein the radial collimator comprises a cold mirror that suppresses reflection of the first sense of light.

11. A method of providing light to an optical fiber comprising:
providing a light source that emits light comprising a first sense of light and a second sense of light;
collimating the light from the light source along an optical axis;
reflecting a first portion of the first sense of light emitted from the light source using a filter positioned at an angle other than normal to the optical axis and less than 45 degrees from the optical axis;
collecting light that passes through the filter with a fiber coupling element, wherein the fiber coupling element comprises a first end to receive light that passes through the filter and a second end that couples light to a numerical aperture limited optics device; and
absorbing light of the first sense that escapes from the fiber coupling element using a light absorbing material that surrounds a portion of the fiber coupling element.

12. The method of providing light to an optical fiber of claim 11 further comprising:
reflecting a second portion of the first sense of light towards the filter, wherein the second portion of the first sense of light is a portion of the first portion of the first sense of light that is reflected from the filter, and wherein the first sense of light that passes through the filter yields a numerical aperture that exceeds a numerical aperture of the numerical aperture limited optics device.

* * * * *